United States Patent [19]
Chambers

[11] 3,995,721
[45] Dec. 7, 1976

[54] PISTON AND EXTENSIBLE CYLINDER THEREFOR

[75] Inventor: Warren D. Chambers, South Bend, Ind.

[73] Assignee: The Bendix Corporation, South Bend, Ind.

[22] Filed: Mar. 3, 1976

[21] Appl. No.: 663,409

[52] U.S. Cl. .................. 188/71.8; 92/13.6; 92/51; 188/72.4; 188/196 A; 188/351; 188/369; 192/111 A
[51] Int. Cl.² ........................................ F16D 65/52
[58] Field of Search ............... 188/72.4, 72.5, 71.8, 188/351, 368, 369, 370; 92/13.1, 13.6, 13, 51; 192/111 A

[56] References Cited
UNITED STATES PATENTS

| | | | |
|---|---|---|---|
| 2,625,135 | 1/1953 | Pitts | 92/51 |
| 2,716,965 | 9/1955 | Klamp | 92/51 X |
| 2,961,831 | 11/1960 | Brueder | 188/351 X |
| 3,915,063 | 10/1975 | Dittinger | 188/196 A X |

Primary Examiner—George E. A. Halvosa
Attorney, Agent, or Firm—Ken C. Decker

[57] ABSTRACT

An extensible cylinder slidably containing a fluid pressure actuated piston is provided with differential first and second area portions exposed to a piston actuating pressurized fluid and an opposing pressurized fluid which opposing fluid is pressurized by a fluid pressure amplifier or booster responsive to the piston actuating pressurized fluid to maintain a proportional relationship between the pressures of the piston actuating fluid and opposing fluid to thereby generate a force balance on the cylinder. A stop on the cylinder is engaged by the piston upon completion of the piston stroke in the cylinder causing the cylinder to advance with the piston to thereby extend the stroke of the piston. The volumetric requirement of the piston actuating pressurized fluid for a given displacement of the piston is constant regardless of the position of the extensible cylinder.

12 Claims, 1 Drawing Figure

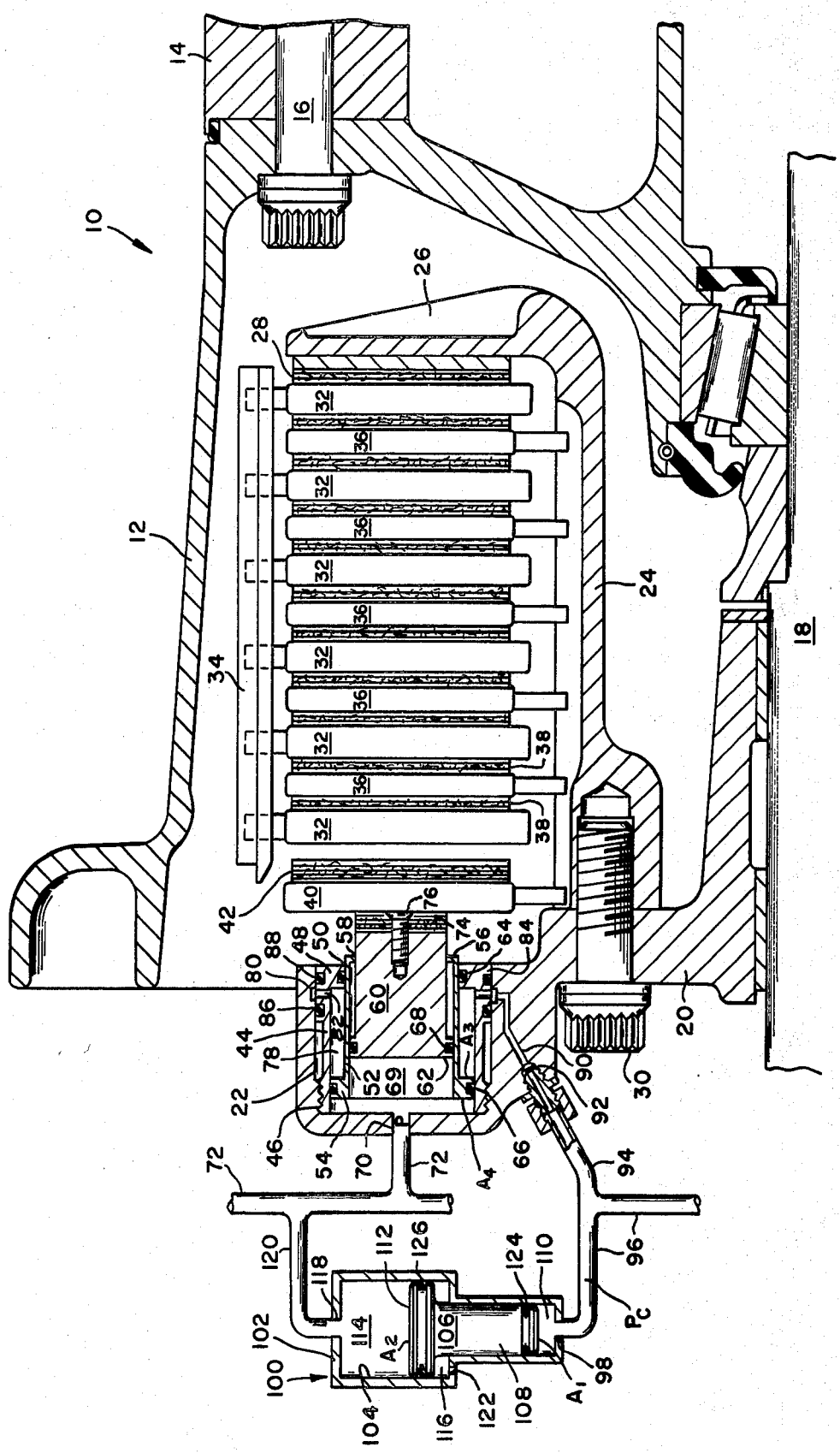

PISTON AND EXTENSIBLE CYLINDER THEREFOR

BACKGROUND OF THE INVENTION

Reference is made to U.S. Pat. No. 3,789,738 in the name of R. F. Horner and U.S. Pat. application Ser. No. 578,693 filed May 19, 1975 in the name of W. G. Price, both of which are assigned to the assignee of the present application, for two examples of prior art disclosing different ways of extending the travel of a brake actuating piston. It will be noted that Pat. No. 3,789,738 teaches a collapsible piston whereas Pat. application Ser. No. 578,693 teaches a piston slidably carried in a fluid pressure actuated cylinder which is advanced in the direction of movement of the piston.

The present invention is an improvement over the above identified prior art devices in that it provides a force balanced fluid pressure responsive cylinder which is actuated by a fluid pressure responsive piston slidably contained therein to extend the piston travel without amplifying the brake actuating force provided by the piston regardless of the fluid pressure acting against the piston and wherein the volumetric requirement of pressurized fluid for a given travel of the piston is constant during actuation of the cylinder.

SUMMARY OF THE INVENTION

The present invention relates to a brake actuating fluid pressure operated piston slidably carried in a movable cylinder which is actuated in the brake applying direction of movement of the piston to thereby extend the range of piston movement accordingly.

It is an object of the present invention to provide a fluid pressure actuated piston slidably carried in a force balanced movable cylinder which is actuated by the piston to provide a range of piston travel in excess of the length of the cylinder.

It is another object of the present invention to provide a fluid pressure actuated piston slidably carried in a force balanced movable cylinder which is easily actuated by the piston to provide a range of piston travel in excess of the length of the cylinder and wherein the force output of the piston is substantially constant for a given pressure applied thereto.

Other objects and advantages of the present invention will be apparent from the following description and accompanying drawings.

BRIEF DESCRIPTION OF THE DRAWINGS

The FIGURE is a schematic representation in section of a portion of a conventional aircraft multiple disc brake embodying the present invention.

DESCRIPTION OF THE PREFERRED EMBODIMENT

Referring to the drawing, numeral 10 designates an aircraft wheel and multiple disc brake therefor. The wheel is defined by two annular sections 12 and 14, only one of which is fully shown, fastened together by circumferentially spaced apart bolts and nuts generally indicated by 16. The wheel is suitably journalled on a rotatably fixed axle 18 carried by conventional aircraft landing gear strut structure, not shown. An annular brake carrier 20 suitably keyed to axle 18 is provided with a plurality of circumferentially spaced apart cavities or chambers 22, only one of which is shown, vented to a conventional source of pressurized fluid P, not shown, controlled by the aircraft pilot. A torque tube 24 having a integral backing plate 26 suitably lined with friction material 28 is fixedly secured to brake carrier 20 by a plurality of circumferentially spaced apart bolts 30. A plurality of axially spaced apart annular brake rotor members 32 are suitably keyed to a retaining member 34 fixedly secured to wheel section 12 and permitting axial movement of rotor members 32 relative to wheel section 12. A plurality of annular brake stator members 36 having friction lining 38 fixedly secured to opposite faces thereof are suitably keyed for axial movement to torque tube 24. The plurality of brake stator members 36 and plurality of brake rotor members 32 are alternately arranged in stacked formation. A pressure plate 40 suitably keyed to torque tube 24 for axial movement thereon and provided with friction lining 42 fixedly secured thereto is adapted to compress the stator members 36 and rotor members 32 together against backing plate 26 to thereby establish frictional engagement of the rotatably fixed members 36 and rotatable rotor members 32.

The cavities 22 are each provided with a sleeve 44 threadedly secured at one end as at 46 to carrier 20 and provided at the opposite end with a radially inwardly extending annular flange 48 defining an opening 50. A cylinder 52 slidably received by opening 50 is provided at one end with a radially outwardly extending annular flange 54 slidably engaged with sleeve 44 and at the opposite end with a radially inwardly extending annular flange 56 defining an opening 58. A piston 60 slidably received by opening 58 has a radially outwardly extending annular flange 62 slidably engaged with cylinder 52. Annular flanges 48, 54 and 62 are suitably recessed to receive "O" rings 64, 66 and 68, respectively, which act as seals against fluid leakage between the respective flanges and adjacent surfaces.

The piston 60 is responsive to pressurized fluid P supplied to a chamber 69 within cavity 22 through a port 70 in carrier 20 and a passage 72 leading from port 70 to the pilot controlled pressure source P, not shown. The piston 60 bears against pressure plate 40 and is provided with a circular section of conventional heat insulation material 74 fixedly secured to the end of piston 60 by suitable fastening means such as a screw 76.

An annular chamber 78 defined by sleeve 44 and cylinder 52 is vented to an annular recess 80 in carrier 20 via one or more radially extending passages 82 extending through an enlarged diameter end portion 84 of sleeve 44. The enlarged diameter portion 84 is provided with suitable axially spaced apart annular recesses which contain O rings 86 and 88, respectively, to provide a seal against fluid leakage between end portion 84 and the adjacent wall of cavity 22. A passage 90 connects annular recess 80 with a port 92 in carrier 20 which port 92, in turn, is vented via a passage 94 to a supply conduit 96 connected to an outlet port 98 of a fluid pressure amplifier or boost device generally indicated by 100.

The boost device 100 includes a casing 102 having a stepped diameter bore 104 therein which slidably contains a two diameter piston 106 the smaller diameter portion 108 of which is slidably received in the smaller diameter portion of bore 104 thereby defining a chamber 110 communicating with outlet port 98. The larger diameter portion 112 of piston 106 is slidably received in the larger diameter portion of bore 104 and divides the same into chambers 114 and 116. Chamber 114 is vented via a port 118 to a passage 120 which, in turn, is connected to passage 72 containing pressurized fluid P. Chamber 116 is vented via a port 122 to atmospheric air at pressure $P_4$. The smaller and larger diameter portions 108 and 112, are suitably recessed to receive O ring seals 124 and 126 respectively, which resist fluid leakage between piston 106 and adjacent surfaces of bore 104.

The chamber 110 and annular chamber 78 as well as passages 82, 90, 94, 96 and annular recess 80 connecting annular recess 78 with chamber 110 are filled with hydraulic fluid which is preferably the same as pressurized fluid P applied to piston 60 and which is a constant volume over the range of pressures encountered in the present environment. The smaller and larger diameter portions 108 and 112, respectively, are provided with corresponding fluid pressure responsive areas $A_1$ and $A_2$ exposed to chambers 110 and 114, respectively. The opposed fluid pressure responsive areas $A_3$ and $A_4$ of annular flange 54 are exposed to annular recess 78 and cavity 22, respectively. The area ratio $A_2/A_1$ is equal to the area ratio $A_4/A_3$ such that, with the same pressurized fluid P acting against areas $A_2$ and $A_4$ and same pressurized fluid $P_c$ acting against areas $A_1$ and $A_3$, it will be recognized that a force balance condition of piston 106 establishes a corresponding force balance of cylinder 52.

In operation, an operator initiated brake application produces an increase in pressure of pressurized fluid P imposed against pistons 60 which urge the pressure plate 40 toward backing plate 26 thereby compressing the rotors 32 and stators 36 together to produce the desired braking action of wheel sections 12 and 14. The pressurized fluid P also acts against areas $A_2$ and $A_4$ of piston 106 and cylinder 52, respectively, tending to unbalance the same. The piston 106 being urged by the pressurized fluid P in a direction to compress the fluid in chamber 110 causes the pressure $P_c$ in chamber 110 and annular chamber 78 to increase to the extent that the force derived from pressurized fluid P acting against area $A_2$ is balanced by an equal force derived from pressure $P_c$ acting against area $A_1$ and the force derived from pressure P acting against area $A_4$ is balanced by the pressure $P_c$ acting against area $A_3$. Thus, as the piston 60 moves in response to pressurized fluid P, the cylinder 52 is held stationary by the force balance existing across annular flange 54. However, as the friction material 42, 38 and 28 tends to wear under repeated applications of the brake, the piston 60 must have a corresponding greater axial travel in cylinder 52 to effect engagement of the rotors and stators, 32 and 36, which travel may exceed the length of the cylinder 52. Extended travel is provided by the cylinder 52 when piston 60 has moved to the extent that flange 62 thereof engages flange 56 of cylinder 52 whereupon the cylinder 52 is displaced axially by piston 60. It will be noted that the force required to displace cylinder 52 is insignificant in view of the balanced condition of the same thereby having little effect on the force output of piston 60 which force output remains proportional to the applied pressurized fluid P.

The axial movement of cylinder 52 in response to pressurization of piston 106 is limited by annular flange 48 which is engaged by annular flange 54 thereby fixing the position of cylinders 52 relative to sleeve 44.

It will be noted that a volumetric increase of chamber 69 in response to movement of cylinder 52 is compensated for by a corresponding decrease in volume of chamber 114 and the resulting transfer of pressurized fluid P therebetween via passages 120 and 72 eliminates any need for pressurized fluid P to be displaced from the controlled pressure source P in addition to the volumetric displacement required by piston 60 upon pressurization of the same. The volume relationship between chambers 69 and 114 for a given axial movement X of piston 60 in a brake energizing direction may be expressed in terms of fluid displacement as follows:

1) $X A_3 = X_1 A_1$ wherein $X_1$ equals the axial movement of Piston 106. From equation (1) there is obtained:

2) $X_1 = (X A_3/A_1)$

The volume, $P_{vol}$, of pressurized fluid P displaced from chamber 114 is given by:

3) $P_{vol} = X_1 A_2$

For no net displacement of pressurized fluid P the following relationship exists:

4) $X_1 A_2 = X A_4$

Substitution of (2) in (4) results in:

5) $P_{vol} = (X A_3 A_2/A_1)$

Since the area ratio relationship of $A_1$, $A_2$, $A_3$ and $A_4$ is defined by:

6) $(A_2/A_1) = (A_4/A_3)$ or $A_1 = (A_2 A_3/A_4)$

By substitution of (6) in (5) there is obtained:

7) $P_{vol} = (X A_3 A_2 A_4/A_2 A_3)$ or $X A_4$

Equation 7 verifies that the pressurized fluid displaced from chamber 114 by piston 106 is equal to the volumetric increase of chamber 69 caused by movement of cylinder 52.

Various modifications and changes in the above described apparatus may be made without departing from the scope of applicant's invention as defined by the following claims.

I claim:
1. Fluid pressure responsive piston means and extensible cylinder means therefor comprising:
   a source of controlled pressurized fluid;
   a chamber vented to said controlled pressurized fluid;
   a cylinder slidably disposed in said chamber and provided with differential first and second fluid pressure responsive fixed area portions exposed to said controlled pressurized fluid and an amplified pressurized fluid of constant volume, respectively, which generate opposing forces;
   a piston slidably carried by said cylinder and responsive to said controlled pressurized fluid;
   fluid pressure amplifier means responsive to said controlled pressurized fluid and operatively connected to said amplified pressurized fluid for pressurizing the same to maintain a predetermined pressure ratio relationship between said controlled pressurized fluid and said amplified pressurized fluid and thus a force balance on said cylinder; and
   first abutment means provided on said cylinder and adapted to be engaged by said piston upon move- ment of said piston axially to a predetermined position in said cylinder whereupon continued movement of said piston causes axial displacement of said cylinder and a corresponding extended stroke of said piston.

2. Fluid pressure responsive piston means and extensible cylinder means therefor as claimed in claim 1 wherein:
said fluid pressure amplifier means includes a casing housing a piston having large and small fixed area portions exposed to said controlled pressurized fluid and said amplified pressurized fluid, respectively, which generate opposing forces;
said large and small area portions having a ratio relationship equal to that of said first and second fixed area portions.

3. Fluid pressure responsive piston means and extensible cylinder means therefrom as claimed in claim 2 wherein:
said piston having large and small fixed area portions is responsive to a force unbalance imposed thereon and movable in response thereto to cause a change in said amplified pressurized fluid to the extent required to establish a force balance thereon as well as on said cylinder.

4. Fluid pressure responsive piston means and extensible cylinder means therefor as claimed in claim 2 wherein:
said large and small fixed area portions define, in part, first and second variable volume chambers, respectively;
said piston having large and small fixed area portions is unbalanced in response to said axial displacement of said cylinder to cause an increase in volume of said second variable volume chamber and a corresponding decrease in volume of said first variable volume chamber resulting in displacement of said controlled pressurized fluid to said chamber to compensate for said axial displacement of said cylinder.

5. Fluid pressure responsive piston means and extensible cylinder means therefor as claimed in claim 1 wherein:
the force output of said piston in response to said controlled pressurized fluid remains substantially constant over the entire range of movement of said piston for any given value of said controlled pressurized fluid.

6. Fluid pressure responsive piston means and extensible cylinder means therefor as claimed in claim 1 wherein:
said first and second fixed area portions are defined by opposite sides of a radially outwardly extending annular flange on one end of said cylinder.

7. Fluid pressure responsive piston means and extensible cylinder means therefor as claimed in claim 6 wherein:
said first abutment means is defined by a radially inwardly extending annular flange on the opposite end of said cylinder.

8. Fluid pressure responsive piston means and extensible cylinder means therefor as claimed in claim 1 wherein;
said chamber is provided with a sleeve removably secured therein;
said cylinder is slidably received by said sleeve.

9. Fluid pressure responsive piston means and extensible cylinder means therefor as claimed in claim 8 and further including:
second abutment means provided on said sleeve adapted to be engaged by said cylinder to limit said extended stroke of said piston.

10. Fluid pressure responsive piston means and extensible cylinder means therefor as claimed in claim 1 wherein:
said extended stroke of said piston is in excess of the axial length of said cylinder.

11. Fluid pressure responsive piston means and extensible cylinder means therefor as claimed in claim 1 wherein:
said amplified pressurized fluid is contained by chamber means defined, in part, by said cylinder and said fluid pressure amplifier means and isolated from said controlled pressurized fluid.

12. Fluid pressure responsive piston means and extensible cylinder means therefor for use in actuating a multiple disc aircraft disc brake having a brake energizing axially movable annular pressure plate and a fixed annular carrier member positioned adjacent thereto comprising:
a plurality of circumferentially spaced apart chambers in said carrier member;
a source of controlled pressurized fluid vented to said plurality of chambers;
a cylinder slidably disposed in each of said chambers and provided with differential first and second fluid pressure responsive fixed area portions exposed to said controlled pressurized fluid and an amplified pressurized fluid, respectively, which generate opposing forces;
a piston slidably carried by said cylinder and responsive to said controlled pressurized fluid;
fluid pressure amplifier means responsive to said controlled pressurized fluid and operatively connected to said amplified pressurized fluid for pressurizing the same to maintain a predetermined pressure ratio relationship between said controlled pressurized fluid and said amplified pressurized fluid and thus a force balance on said cylinder; and
abutment means provided on said cylinder and adapted to be engaged by said piston upon movement of said piston axially to a predetermined position in said cylinder whereupon continued movement of said piston causes axial displacement of said cylinder and a corresponding extended stroke of said piston;
said pistons being simultaneously pressurized by said controlled pressurized fluid to actuate said movable pressure plate and energize said brake.

* * * * *